(12) United States Patent
Measom et al.

(10) Patent No.: US 11,186,048 B2
(45) Date of Patent: Nov. 30, 2021

(54) SYSTEMS AND METHODS OF CONSTRUCTING COMPOSITE ASSEMBLIES

(71) Applicant: Bell Helicopter Textron Inc., Fort Worth, TX (US)

(72) Inventors: Ronald Measom, Hurst, TX (US); James R. Stamper, Jr., Fort Worth, TX (US); Robert Self, Fort Worth, TX (US); Paul Sherrill, Grapevine, TX (US); Paul K. Oldroyd, Azle, TX (US); Neil Edward Morrow, Colleyville, TX (US); Russell Cole, Euless, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 85 days.

(21) Appl. No.: 15/989,839

(22) Filed: May 25, 2018

(65) Prior Publication Data

US 2018/0264755 A1    Sep. 20, 2018

Related U.S. Application Data

(63) Continuation of application No. 15/492,274, filed on Apr. 20, 2017, now Pat. No. 10,005,242, which is a
(Continued)

(51) Int. Cl.
| | |
|---|---|
| *B23P 15/04* | (2006.01) |
| *B29C 70/34* | (2006.01) |
| *B29C 70/46* | (2006.01) |
| *B29C 70/54* | (2006.01) |
| *F01D 5/28* | (2006.01) |

(Continued)

(52) U.S. Cl.
CPC ............ *B29C 70/342* (2013.01); *B23P 15/04* (2013.01); *B29C 70/46* (2013.01); *B29C 70/541* (2013.01);
(Continued)

(58) Field of Classification Search
CPC ........ F01D 5/282; B23P 15/04; B29C 70/541; B29C 70/342; B29C 70/46;
(Continued)

(56) References Cited

U.S. PATENT DOCUMENTS

| | | | |
|---|---|---|---|
| 4,169,749 A | 10/1979 | Clark | |
| 4,565,595 A * | 1/1986 | Whitener | ............... B29C 70/08 156/156 |

(Continued)

FOREIGN PATENT DOCUMENTS

| | | |
|---|---|---|
| CA | 2846669 A1 | 9/2014 |
| EP | 2777917 A1 | 9/2014 |
| WO | 1984/004905 | 12/1984 |

OTHER PUBLICATIONS

European Patent Office, Search Report for EP Appl. No. 14153800.9 dated Aug. 1, 2014, 4 pp.
(Continued)

*Primary Examiner* — Jun S Yoo
(74) *Attorney, Agent, or Firm* — Edwin S. Flores; Daniel J. Chalker; Chalker Flores, LLP

(57) ABSTRACT

A method of constructing a cured composite assembly includes positioning a composite assembly within a bonding tool, wherein the composite assembly comprises an uncured composite spar and a skin and performing a curing cycle on the composite assembly to simultaneously cure the uncured composite spar and bond the skin to the cured composite spar.

8 Claims, 9 Drawing Sheets

Related U.S. Application Data continuation of application No. 13/840,881, filed on Mar. 15, 2013, now Pat. No. 9,638,048.

(51) Int. Cl.
| | | |
|---|---|---|
| *B64F 5/10* | (2017.01) | |
| *B64C 27/473* | (2006.01) | |
| *B29K 63/00* | (2006.01) | |
| *B29K 105/08* | (2006.01) | |
| *B29K 307/04* | (2006.01) | |
| *B29L 31/08* | (2006.01) | |

(52) U.S. Cl.
CPC .............. *B64C 27/473* (2013.01); *B64F 5/10* (2017.01); *F01D 5/282* (2013.01); *B29K 2063/00* (2013.01); *B29K 2105/0881* (2013.01); *B29K 2307/04* (2013.01); *B29L 2031/082* (2013.01); *B64C 2027/4736* (2013.01); *Y10T 29/49337* (2015.01)

(58) Field of Classification Search
CPC .......... Y10T 29/49337; B23C 2215/00; B64C 2027/4736; F05D 2230/60
See application file for complete search history.

(56) References Cited

U.S. PATENT DOCUMENTS

| | | | | |
|---|---|---|---|---|
| 5,248,242 | A | * | 9/1993 | Lallo ................... B29C 70/342 |
| | | | | 156/156 |
| 6,561,459 | B2 | | 5/2003 | Amaoka et al. |
| 8,789,275 | B2 | | 7/2014 | Esaki et al. |
| 9,381,679 | B2 | | 7/2016 | Bishop et al. |
| 9,638,048 | B2 | | 5/2017 | Measom et al. |
| 10,005,242 | B2 | | 6/2018 | Measom et al. |
| 2002/0195524 | A1 | * | 12/2002 | Amaoka .................. B64C 3/00 |
| | | | | 244/123.2 |

OTHER PUBLICATIONS

European Patent Office, Communication pursuant to Article 94(3) EPC for EP Appl. No. 14153800.9 dated Dec. 19, 2014, 4 pp.
European Patent Office, Invitation pursuant to Rule 62a(1) EPC for EP Appl. No. 14153800.9 dated Jun. 23, 2014, 2 pp.
Canadian Intellectual Property Office, Examination Report for Canadian Appl. No. 2,846,669 dated Apr. 8, 2015.

* cited by examiner

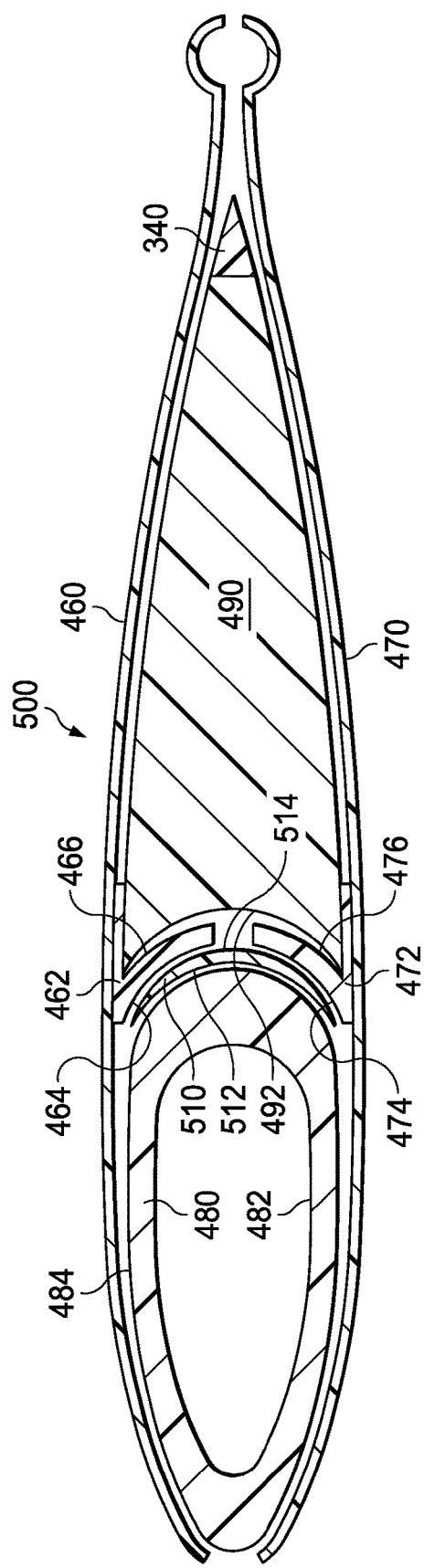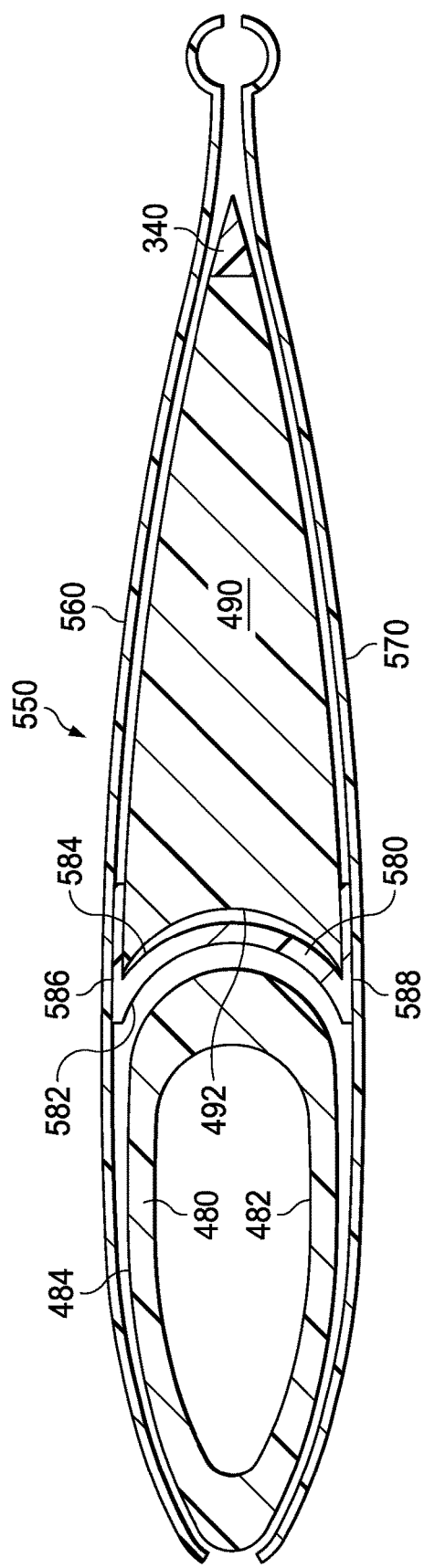

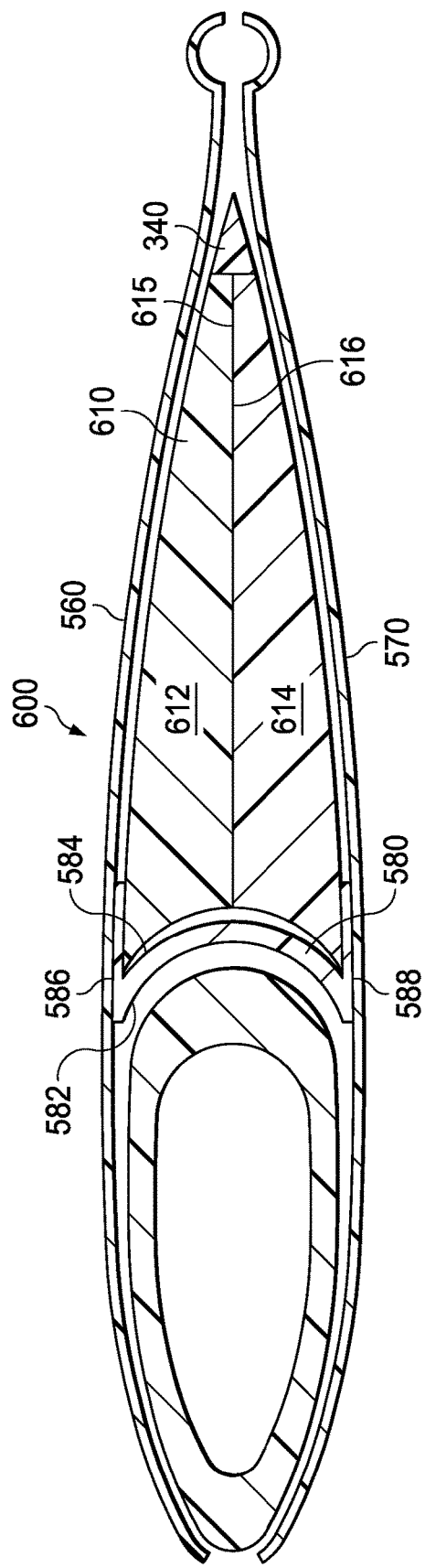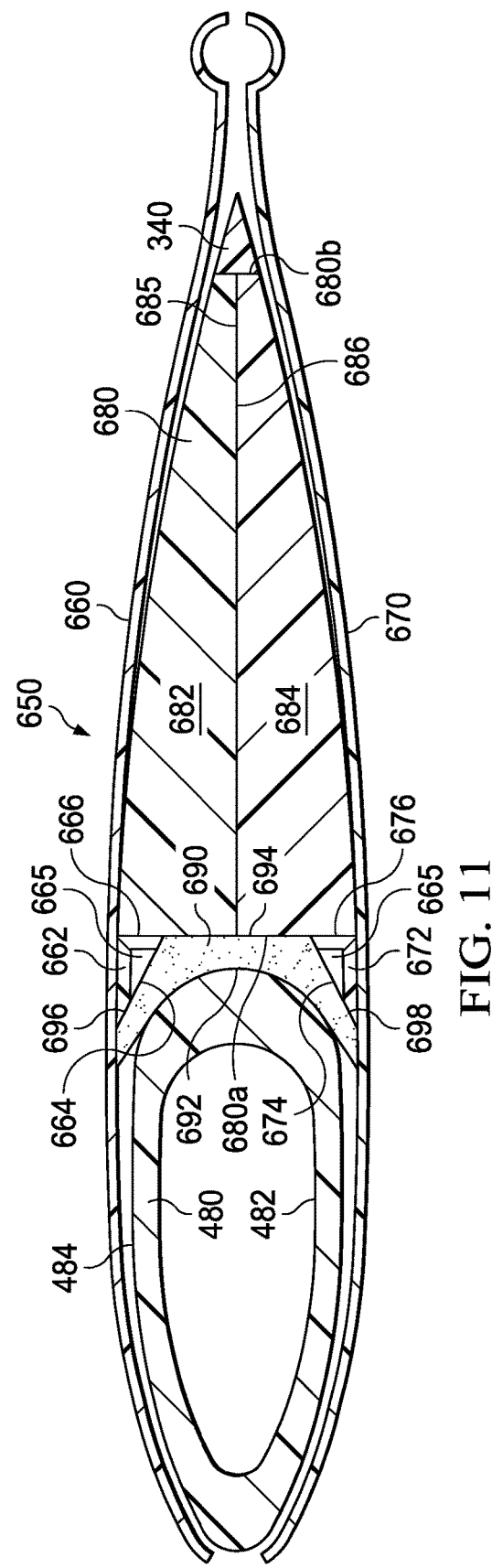

SYSTEMS AND METHODS OF CONSTRUCTING COMPOSITE ASSEMBLIES

CROSS-REFERENCE TO RELATED APPLICATIONS

This application claims priority to and is a continuation patent application of U.S. patent application Ser. No. 15/492,274 filed on Apr. 20, 2017, which is a continuation patent application of U.S. patent application Ser. No. 13/840,881, now U.S. Pat. No. 9,638,048, filed on Mar. 15, 2013, all of which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Creating composite assemblies, such as composite helicopter rotor blades, sometimes requires a costly and time consuming process comprising curing particular composite components and assemblies and followed by assembling the cured components to form the overall composite assembly. In some cases, the composite assembly includes a structural member referred to as a "spar," which may extend the axial length of the structure and provide support against loads applied to the structure. In the case of airfoil shaped blades or wings, the spar may support both the weight of the blade and any aerodynamic loads applied to the blade, such as lift and drag forces.

In some cases, the spar may be formed from a composite preform that is cured prior to assembly with the other components of the structure, such as skin assemblies in the case of composite blades. During this curing process, an inflatable bladder may be disposed within the uncured spar and expanded to help compact the layers of preformed composite material and remove any excess air bubbles or other voids included in the preform as the spar is cured at an elevated temperature within a precision mold. Once cured, the other components or "details" of the composite assembly are assembled with the spar. For instance, in the case of a blade, the outer skins and leading edge are assembled with the spar and then bonded in a subsequent curing process, sometimes referred to as the assembly "curing cycle" or "bond cycle."

The assembly process requiring a relatively high level of precision in order to consistently achieve the tight tolerances in sizing and placement of all the components required to minimize any defects formed during the assembly process, such as voids or overly thick bond lines formed between components. Moreover, the placement and fitting of the components forming the composite assembly may need to be monitored and maintained for a period of time during the operational life of the composite assembly to ensure proper and adequate performance. For example, in the case of composite blades, the placement and sizing of the details may need to be monitored in order to ensure composite blade has maintained the proper contour.

SUMMARY

In some embodiments of the disclosure, a method of constructing a cured composite assembly is disclosed as comprising positioning a composite assembly within a bonding tool, wherein the composite assembly comprises an uncured composite spar and a skin and performing a curing cycle on the composite assembly to simultaneously cure the uncured composite spar and bond the skin to the cured composite spar.

In other embodiments of the disclosure, a composite assembly having a leading edge and a trailing edge is disclosed as comprising an upper skin assembly extending between the leading edge and the trailing edge and comprising an upper spar key and a lower skin assembly extending between the leading edge and the trailing edge and comprising a lower spar key. In addition, the composite assembly may comprise a spar disposed between the upper skin assembly and the lower skin assembly and a core disposed between the upper skin assembly and the lower skin assembly and aft of the spar. The spar key of the upper skin assembly may comprise a flanged portion that extends towards the lower skin assembly and is disposed aft of the spar and fore of the core.

In still other embodiments of the disclosure, a composite assembly having a leading edge and a trailing edge is disclosed as comprising an upper skin assembly extending between the leading edge and the trailing edge and a lower skin assembly extending between the leading edge and the trailing edge. In addition, the composite assembly may comprise a spar disposed between the upper skin assembly and the lower skin assembly and a core disposed between the upper skin assembly and the lower skin assembly, wherein the core has a fore end distal the trailing edge, an aft end proximal the trailing edge and a chord line extending between the fore and aft end. The core may comprise a support layer extending between the fore and aft ends of the core along the chord line.

BRIEF DESCRIPTION OF THE DRAWINGS

For a more complete understanding of the present disclosure and the advantages thereof, reference is now made to the following brief description, taken in connection with the accompanying drawings and detailed description:

FIGS. 7-11 are orthogonal cut-away side section views of alternative embodiments of composite blade assemblies according to embodiments of the disclosure;

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a composite assembly configured to allow the use of an uncured spar in the assembly process, such as the blade assembly process used in the construction of composite airfoil-shaped helicopter rotor blades, followed by a curing process that serves both to cure the spar and bond the other composite components used in the composite assembly together. In some embodiments, a composite blade assembly is disclosed that comprises a spar and a set of upper and lower skins that extend between the leading and trailing edges of the composite blade via upper and lower composite spar keys that are formed integrally with the upper and lower skins. In some embodiments, a composite blade assembly is disclosed that further comprises a spar dam that is disposed within the composite blade between the spar and a skin core that extends to the trailing edge of the blade. In some embodiments, a composite blade assembly is disclosed having an upper core, a lower core and a septum support layer extending between the upper and lower cores.

Figure 1:
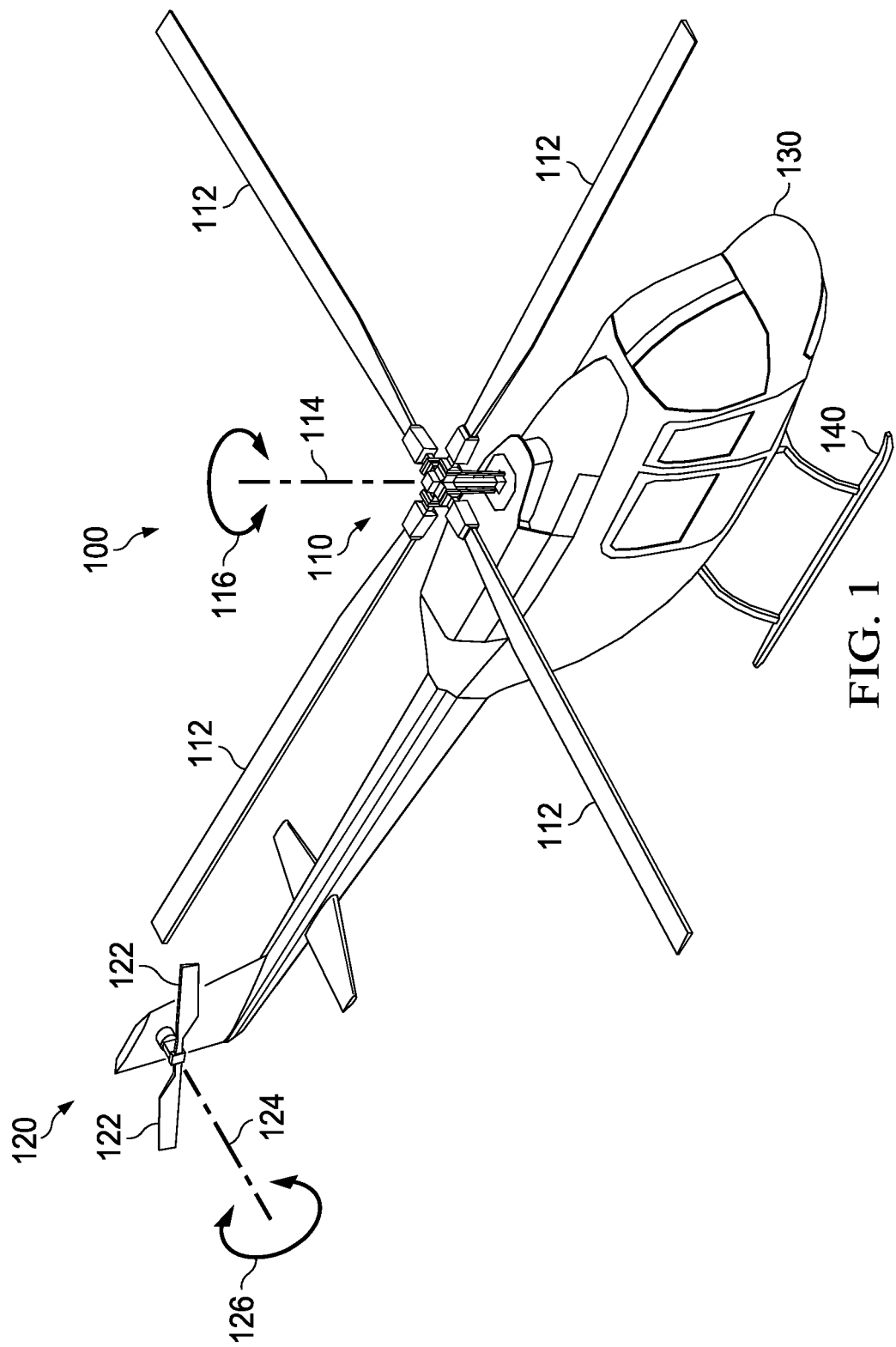
FIG. 1 is a perspective view of a helicopter according to an embodiment of the disclosure.

FIG. 1 is a perspective view of a helicopter 100. Certain embodiments of the disclosure may be used with a helicopter such as helicopter 100. However, it should be understood that the helicopter example is given merely for illustration purposes only. Embodiments of the present disclosure are not limited to any particular setting or application, and embodiments can be used with a rotor system in any setting or application such as with other aircraft, vehicles, or equipment. Certain embodiments of the composite assemblies and methods of forming such disclosed herein may be used for any application involving a composite, aerodynamically shaped object. For example, some embodiments of the composite assemblies disclosed herein may be used for the main and/or tail rotors of a rotorcraft, such as helicopter 100. Also, some embodiments of the composite assemblies disclosed herein may be used for the wings of a fixed-wing aircraft.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. In an embodiment, blades 112 may be formed from composite blade assemblies. Main rotor assembly 110 generates a lift force that supports the weight of helicopter 100 and a thrust force that counteracts aerodynamic drag. Main rotor assembly 110 can also be used to induce pitch and roll of helicopter 100.

Tail rotor assembly 120 includes two or more blades 122 that are rotated about an axis of rotation 124 in either a clockwise direction or a counterclockwise direction as indicated by arrow 126. In an embodiment, blades 122 may be formed from composite blade assemblies. Tail rotor assembly 120 counters the torque effect created by main rotor assembly 110 and allows a pilot to control the yaw of helicopter 100.

Fuselage 130 is the main body section of helicopter 100. Fuselage 130 optionally holds the crew, passengers, and/or cargo and houses the engine, transmission, gear boxes, drive shafts, control systems, etc. that are needed to establish an operable helicopter. Landing gear 140 is attached to fuselage 130 and supports helicopter 100 on the ground and allows it to take off and land.

Figure 2:
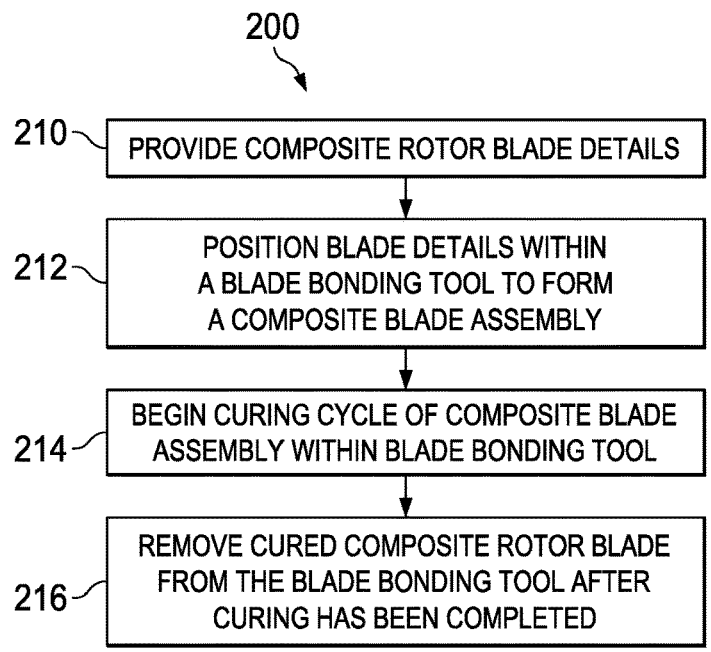
FIG. 2 is a flowchart of a method of forming a cured blade assembly from a plurality of blade components or details.

Referring now to FIG. 2, in some embodiments a method 200 may be used for forming a cured blade assembly from a plurality of blade components or details. The method 200 may begin at block 212 by providing the blade details. In some embodiments, the blade details may comprise an uncured spar, a core, an upper and a lower skin with each having an integrally formed skin spar key, an uncured trailing edge and a leading edge abrasion assembly. The method 200 may continue at block 214 by positioning the details within a blade bonding tool to form a composite blade assembly. In some embodiments, block 214 may further comprise applying a film adhesive to surfaces of the uncured spar, core and upper and lower skins to promote bonding between the skins, uncured spar and core. In some embodiments, block 214 may further comprise disposing a mandrel and/or inflatable bladder at least partially filled with fluid within an axially extending cavity of the uncured spar.

The method 210 may continue at block 216 by beginning a curing cycle of the composite blade assembly disposed within the blade bonding tool. In some embodiments, the curing cycle of block 216 may comprise heating the composite blade assembly to an elevated temperature over a given period of time. In an embodiment, blade assembly may be heated to about 300-350° F. for about 1-2 hours. However, in other embodiments the temperature and duration of the curing cycle may vary depending on the particular blade details utilized in conducting method 200. In some embodiments, block 216 may further comprise expanding an inflatable bladder disposed within an axially cavity of the spar so as to expand the spar radially outward during curing. In this embodiment, the radial expansion of the spar may help reduce the number of voids formed between the outer surface of the spar, the upper and lower skins and the inner surface of the leading edge abrasion assembly. The method 200 may continue at block 218 by removing the cured composite blade assembly from the blade bonding tool after the curing cycle has been completed. In some embodiments, block 218 may further comprise trimming or removing any excess skin at the trailing edge of the cured composite blade assembly.

Figure 3:
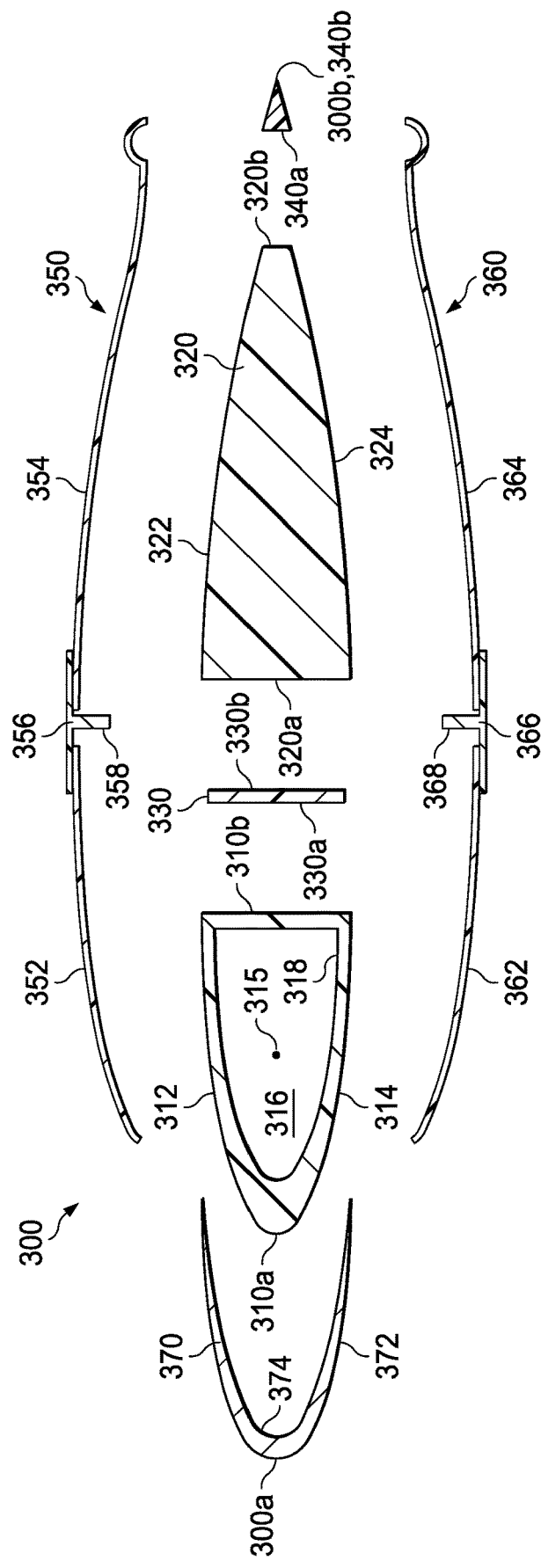
FIG. 3 is an exploded orthogonal cut-away side section view of a composite blade assembly according to an embodiment of the disclosure.

Referring to FIG. 3, an orthogonal cut-away side section view of an exploded uncured composite rotor blade assembly 300 is shown. In an embodiment, rotor blade assembly 300 may be used to form the main rotor blades 112 of helicopter 100. In another embodiment, rotor blade assembly may be used to form the tail rotor blades 122 of helicopter 100. In this embodiment, blade assembly 300 has a first or leading edge 300a and a second or trailing edge 300b. Uncured blade assembly 3300 generally comprises a plurality of details, such as an uncured spar 310, a core 320, an elongate spar dam 330, a trailing edge 340, an upper skin 350, a lower skin 360 and an abrasion strip assembly 370.

Spar 310 may generally comprise a first or fore end 310a disposed proximal leading edge 300a, a second or aft end 310b and a central axis 315 extending out of the page. Spar 310 may further comprise a pliable uncured body 312 having an outer surface 314, a central cavity 316 defined by an inner surface 318 and disposed coaxially with axis 315. In an embodiment, the body 312 of uncured spar 310 comprises two or more layers of uncured unidirectional laminate material. The plurality of unidirectional layers may be stacked or layered at varying angular directions relative to one another to achieve the desired strength and flexibility desired for the particular application. In this embodiment, each unidirectional layer is formed from fiberglass or carbon fiber composite material. However, in other embodiments the unidirectional layers may comprise other types of composite materials.

The core 320 has a first or fore end 320a disposed proximal to aft end 310b of spar 310, a second or aft end disposed proximal trailing edge 300b of blade assembly 300, an upper surface 322 and a lower surface 324. In an embodiment, core 320 is formed from a relatively lightweight a Nomex™ Honeycomb non-metallic composite material. However, in other embodiments, core 320 may comprise other lightweight composite or metallic materials. Typically, the core cells are oriented generally perpendicular to the blade chord line, but may be otherwise oriented.

Elongate spar dam 330 is disposed between spar 310 and core 320, having a fore surface 330a facing the aft end 310b of spar 310 and an aft end 330b facing the fore end 320a of core 320. In an embodiment, spar dam 330 comprises a cured laminate composite material, providing it with a relatively greater degree of rigidity relative to the uncured spar 310. Spar dam 330 may comprise fiberglass or carbon fiber composite material.

The trailing edge 340 is disposed aft of both spar 310 and core 320 and generally comprises a fore end 340a facing the aft end 320b of core 320 and an aft end 340b that may at least partially define the trailing edge 300b of blade assembly 300. In an embodiment, trailing edge 340 comprises an uncured laminate composite material, such as fiberglass or carbon fiber composite material.

Upper and lower skins 350 and 360 extend substantially between leading edge 300a and trailing edge 300b of blade assembly 300. In this embodiment, skins 350, 360, each include a fore section 352, 362, respectively, and an aft section 354, 364, respectively. Fore section 352 of upper skin 350 extends between leading edge 300a and an integrally formed upper spar key 356, which includes an upper flanged portion 358 that extends substantially orthogonally from upper skin 350 towards lower skin 360. Aft section 354 extends substantially between the integrally formed key 356 to the trailing edge 300b of blade assembly 300. Similarly, in this embodiment, fore section 362 of lower skin 360 extends substantially between leading edge 300a and an integrally formed lower spar key 366, which includes a lower flanged portion 368 that extends substantially orthogonally from lower skin 360 towards upper skin 350. Aft section 364 of lower skin 360 extends between the integrally formed lower key 366 to the trailing edge 300b of blade assembly 300.

In an embodiment, upper and lower skins 350 and 360, including upper and lower keys 356 and 366, comprise a cured or uncured composite laminate material. In some embodiments, skins 150 and 160 may be uncured while the upper and lower keys 356 and 366, respectfully, may be cured. For instance, skins 350 and 360 may comprise fiberglass or carbon fiber composite material. In some embodiments, the cured composite forming upper and lower spar keys 356 and 366, may provide spar keys 356 and 366 with a relatively greater level of rigidity relative the uncured composite forming body 312 of spar 310. In some embodiments, the composite assembly 300 may not include spar dam 330. For example, assembly 300 may not include spar dam 330 in an embodiment where the upper and lower keys 356 and 366 may extend to the chord line of blade assembly 300.

Abrasion strip assembly 370 is disposed at leading edge 300a of blade assembly 300 and comprises a fore convex surface 372 that may at least partially defines leading edge 300a and an aft concave surface 374 facing trailing edge 300b. In some embodiments, abrasion strip assembly 370 comprises a metallic material. For instance, in an embodiment, strip assembly 370 may comprise a steel alloy or an aluminum alloy.

Figure 4:
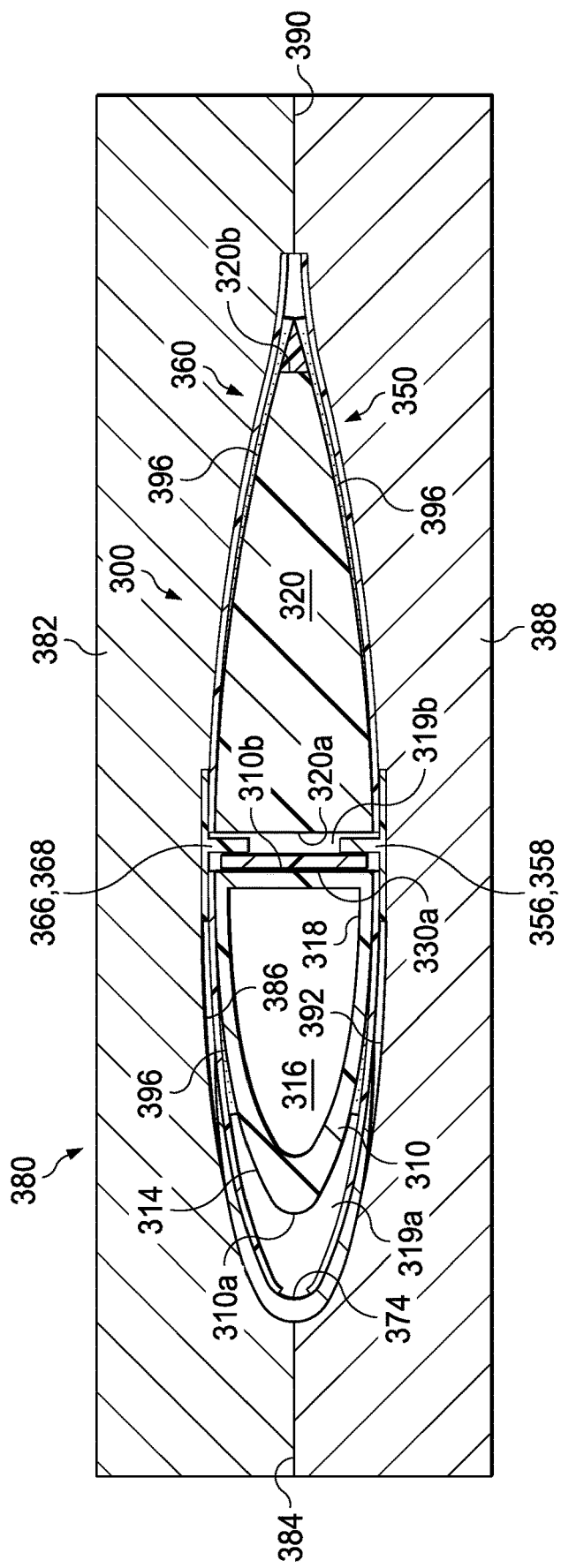
FIG. 4 is an orthogonal cut-away side section view of the composite blade assembly of FIG. 3 and a blade bonding tool according to an embodiment of the disclosure.

Referring now to FIG. 4, an orthogonal cut-away side section view of the composite rotor blade assembly 300 and a blade bonding tool 380 is shown. In this embodiment, blade bonding tool 380 generally comprises an upper portion 382 and a lower portion 388. Upper portion 382 comprises an upper mold surface 384 with an upper concavity 386 formed thereon. Similarly, lower portion 388 comprises a lower mold surface 390 having a lower concavity 392 formed thereon, where upper mold surface 384 of upper portion 382 may face lower mold surface 390 of lower portion 388. Upper and lower concavities 386 and 392 may align to form a mold cavity 394, which may be configured to house the assembled composite blade assembly 300. In an embodiment, upper and lower portions 382 and 388 of bonding tool 380 may comprise a carbon or stainless steel alloy.

As configured in the embodiment illustrated in FIG. 4, upper skin 350 is disposed proximal and in physical engagement with lower concavity 392 while lower skin 360 is disposed proximal and in physical engagement with upper concavity 386. To promote bonding, in an embodiment, a film adhesive 396 may be disposed at the interfaces between core 320 and upper and lower skins 350, 360. Adhesive 396 may also be disposed at the interface between the outer surface 314 of spar 310 and the upper and lower skins 350, 360. Further, adhesive 396 may be disposed at the interface between the concave surface 374 of abrasion strip 370 and the upper and lower skins 350, 360.

In this embodiment, upper flanged portion 358 of upper spar key 356 extends towards lower skin 360. A fore surface 358a of flanged portion 358 faces leading edge 300a and is in physical engagement with aft surface 330b of spar dam 330. An aft surface 358b of upper flanged portion 358 faces trailing edge 300b and is in physical engagement with the fore end 320a of core 320. Similarly, in this embodiment, lower flanged portion 368 of lower spar key 366 extends towards upper skin 350. A fore surface 368a of flanged portion 368 faces leading edge 300a and is in physical engagement with aft surface 330b of spar dam 330. An aft surface 368b of lower flanged portion 368 faces trailing edge 300b and is in physical engagement with the fore end 320a of core 320. Further, the fore surface 330a faces leading edge 300a and is in physical engagement with the aft end 310b of spar 310. In an embodiment, spar dam 330 may form part of the laminate layup of the uncured spar 310. In this embodiment, spar dam 330 may be compacted into place along the aft end 310b of spar 310 via being placed onto the torque wrap plies forming aft end 310b.

In this embodiment, prior to the commencement of the curing cycle, a fore cavity 319a is disposed between the concave surface 374 of abrasion strip 370 and the outer surface 314 of spar 310. Also, one or more aft cavities 319b are disposed between the fore end 320a of core 320 and the aft end 310b of spar 310. A supporting mandrel 397 and inflatable bladder 398 are disposed within the central cavity 316 of uncured spar 310. Bladder 398 may be inflated during the curing process, such as the curing process described below.

Figure 5:
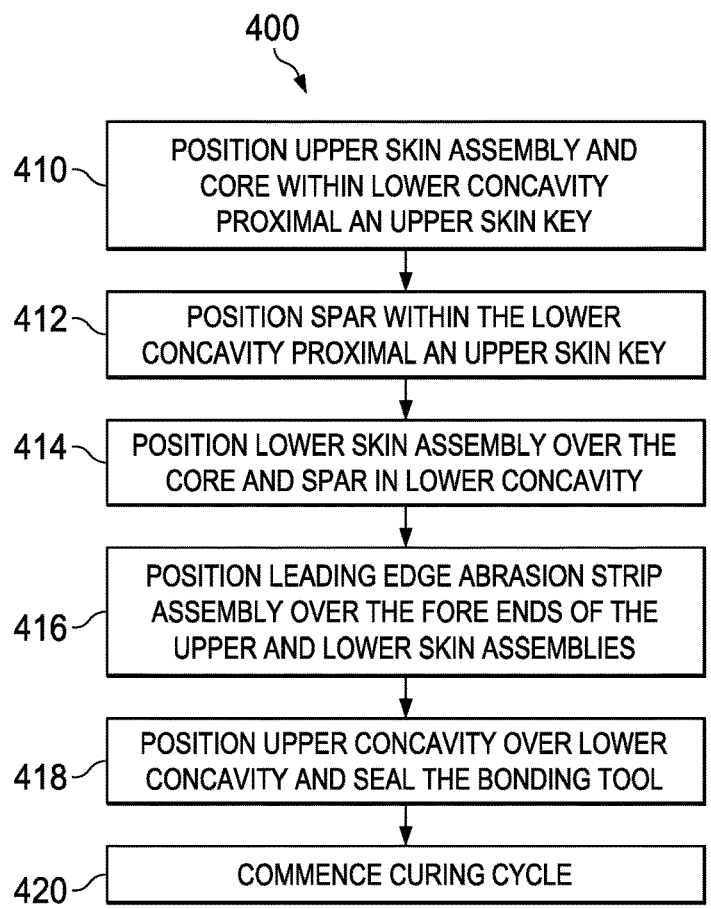
FIG. 5 is a flowchart of a method of assembling and curing the composite blade assembly of FIG. 3 according to an embodiment of the disclosure.

Referring now to FIG. 5, in some embodiments a method 400 may be used for assembling and curing the uncured composite blade assembly. The method 400 may begin at block 402 by positioning an upper skin and a core within a lower concavity of a bonding tool. The method 400 may continue at block 404 by positioning an uncured spar within the lower concavity proximal an upper spar key of the upper skin. The method 400 may continue at block 406 by positioning a lower skin assembly over the core and uncured spar disposed in the lower concavity. The method 400 may continue at block 408 by positioning a leading edge abrasion strip assembly over the fore ends of the upper and lower skin assemblies. The method 400 may continue at block 410 by positioning an upper concavity of the bonding tool over the lower concavity and sealing the bonding tool. In an embodiment, sealing the bonding tool may comprise engaging an upper mold surface of an upper portion of the tool against a lower mold surface of a lower portion of the tool. The method 400 may continue at block 412 by commencing a cure cycle. In some embodiments, the cure cycle of block 412 may share similarities with the cure cycle described in block 216 of the method 200 of FIG. 2.

Figure 6:
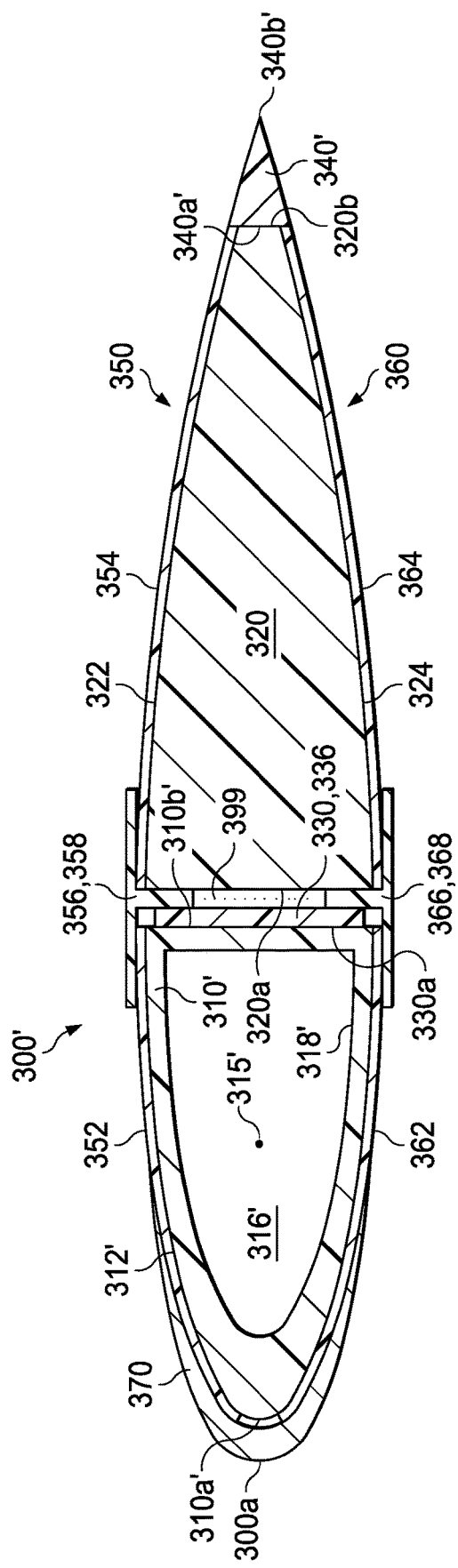
FIG. 6 is an orthogonal cut-away side section view of a cured composite blade assembly according to an embodiment of the disclosure.

Referring now to FIG. 6, in some embodiments following assembly and curing within a bonding tool, a cured composite blade assembly 300' is formed. During a curing cycle, such as the curing cycle described in block 412 of method 400, the temperature of the blade assembly 300 is elevated and the fluid pressure within the inflatable bladder 398 is increased, causing cavity 316 of spar 310 to expand, stretching the pliable body 312 of the curing spar 310. During the expansion of bladder 398 and body 312 of spar 310, the fore cavity 319a shown in FIG. 4 decreases in size as the outer surface 314 of spar 310 comes into physical engagement with the fore sections 352 and 362 of upper and lower skins 350 and 360, respectively, which physically engage the concave surface 374 of the relatively rigid abrasion strip assembly 370.

Further, in this embodiment, as body 312 of the curing spar 310 expands during the curing cycle, aft end 310b and spar dam 330 react or physically engage against and are retained by the upper flanged portion 358 and lower flanged portion 368 of upper spar key 356 and lower spar key 366, respectively. Thus, physical engagement between spar dam 330 and spar keys 356 and 366 prevent or at least substantially restrict the spar 310 from expanding farther in the aft direction towards trailing edge 300b.

In some embodiments, the fore cavity 319a present in blade assembly 300 has been substantially eliminated in the cured assembly 300', which features a cured spar 310' and a cured trailing edge 340'. A foaming adhesive 399 may be injected into the one or more aft cavities 319b formed between the aft end 310b' of cured spar 310' and the fore end 320a of core 320. The cured spar 310' may be relatively less pliable than the uncured spar 310 of blade assembly 310, allowing cured spar 310' to resist loads applied to blade assembly 300', such as loads created by the weight of assembly 300' and/or external loads applied to assembly 300', such as the aerodynamic loads of lift and drag.

Figure 7:
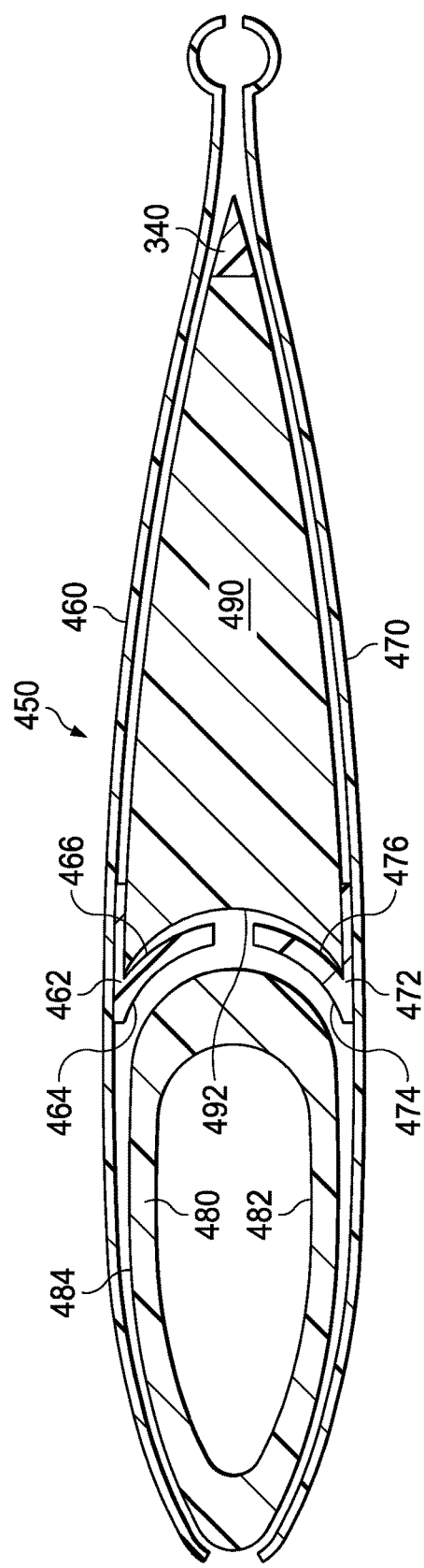

Referring now to FIGS. 7-11, orthogonal cut-away side section views of other embodiments of composite blade assemblies are shown. Specifically, FIG. 7 shows a composite blade assembly 450 comprising upper and lower skin assemblies 460 and 470, an uncured composite spar 480 and a core 490. In this embodiment, upper skin assembly 460 comprises an integral spar key 462 having a concave fore surface 464 and a convex aft surface 466 for engagement with a concave fore end 492 of core 490 following curing. Similarly, lower skin assembly 470 comprises an integral spar key 472 having a concave fore surface 474 and a convex aft surface 476 for engagement with the concave fore end 492 of core 490 following curing. Also, in this embodiment, spar 480 comprises a body 482 having a generally rounded outer surface 484 for engagement with the concave fore surfaces 464 and 474 of spar keys 462 and 472, respectively, following a curing cycle.

FIG. 8 shows a composite blade assembly 500 comprising uncured composite spar 480, core 490, upper and lower skin assemblies 460 and 470, respectfully, and a pre-cured spar dam 510. Spar dam 510 comprises a concave fore end 512 for engagement with the rounded outer surface 484 of uncured spar 480 and a convex aft surface 514 for engagement with the upper and lower spar keys 462 and 472, respectively. In this embodiment, the spar dam 510 may be incorporated within blade assembly 500 for providing support against any shear loads applied to the assembly 500. Also, spar dams (e.g., spar dam 510) may be incorporated within a composite blade assembly (e.g., blade assembly 500) to provide additional support during the curing cycle when relatively high fluid pressure is utilized within an inflatable bladder (e.g., bladder 398) for expanding the core during curing. The spar keys 462 and 472 may be sized such that they physically engage or contact each other after final assembly or there may be a gap between keys 462 and 472 sufficiently small enough to prevent spar 480 from exerting a force, such as through physical engagement, with core 490.

FIG. 9 shows a composite blade assembly 550 comprising upper and lower skin assemblies 560 and 3570, uncured composite spar 480 and core 490. In this embodiment, a spar dam 580 extends between upper skin assembly 560 and lower skin assembly 570, and comprises a contiguous concave fore surface 582 for engagement with the rounded outer surface 484 of spar 480 and a contiguous convex aft surface 584 for engagement with the concave fore end 492 of core 490 following curing. In an embodiment, convex aft surface 584 may be bonded to the fore end 492 of core 490. Spar dam 580 may further comprise an upper surface 586 bonded to upper skin assembly 560 and a lower surface 588 bonded to lower skin assembly 570. In this embodiment, spar dam 580 may be machined during the carving process performed on the core 490. Also, in this embodiment no spar keys are coupled to or formed as part of the upper and lower skin assemblies 560 and 570, respectfully.

FIG. 10 shows a composite blade assembly 600 similar to blade assembly 550 but comprising a core 610 in lieu of core 490 included in assembly 550. In this embodiment, core 610 includes an upper portion 612 disposed proximal upper skin assembly 560 and a lower portion 614 disposed proximal lower skin assembly 570. Disposed between upper portion 612 and lower portion 614 is a septum or support layer 616 that extends along a median chord line 615 of core 610 between a fore end 610a and an aft end 610b of core 610. In this embodiment, support layer 616 may comprise a glass, metal or epoxy material such that support layer 616 may provide additional support to spar dam 580 in resisting the radial expansion of spar 480 during the curing cycle, such as the curing cycle discussed in block 412 of method 400. For example, in some embodiments, support layer 616 may comprise aluminum alloys, steel alloys, fiberglass and carbon fiber. Also, support layer 616 may be integral with the spar dam 580.

FIG. 11 shows a composite blade assembly 650 generally comprising uncured composite spar 480, an upper skin assembly 660 comprising an integrally formed upper spar key 662 and a lower skin assembly 670 comprising an integrally formed lower spar key 672 and a core 680. In this embodiment, core 680 has a fore end 680a, an aft end 680b and comprises an upper portion 682 and a lower portion 684. Similar to core 610 in blade assembly 600, a septum or support layer 686 is disposed between the upper and lower portions 682, and 684 and extends between fore end 680a and aft end 680b along a median chord line 685 of core 680.

In this embodiment, upper and lower spar keys 662 and 672 each comprise angled fore surfaces 664 and 674, respectively, and aft surfaces 666 and 676, respectively. While in this embodiment aft surfaces 666 and 676 are shown as extending substantially orthogonally relative upper and lower skin assemblies 660 and 670, respectively, in other embodiments a chamfer may be provided on aft surfaces 666 and 676 to provide an angle relative to the fore end 680a of core 680. Spar keys 662 and 672 each further comprise an insert 665. Inserts 665 may comprise lightweight structural foam, such as the Rohacell® foam offered by Evonik Foams, Inc. at 800 N. Watters Road, Allen, Tex. 75013.

In this embodiment, a tapered backwall 690 is disposed between the uncured spar 480 and the core 680. Backwall 690 comprises concave fore surface 692 in engagement with the rounded outer surface 482 of spar 480, an aft surface 694 in engagement with the fore end 680a of core 680. Backwall 690 further comprises an upper angled surface 696 and a lower angled surface 698 that physically engage angled fore surfaces 664 and 674 of the upper and lower spar keys 660 and 670, respectively. Backwall 690 may be formed from a lightweight structural foam, such as Rohacell®. In this arrangement, backwall 690, spar keys 662 and 672, and support layer 686 may act in concert to restrict the expansion of uncured core 480 during the curing cycle.

Figure 12:
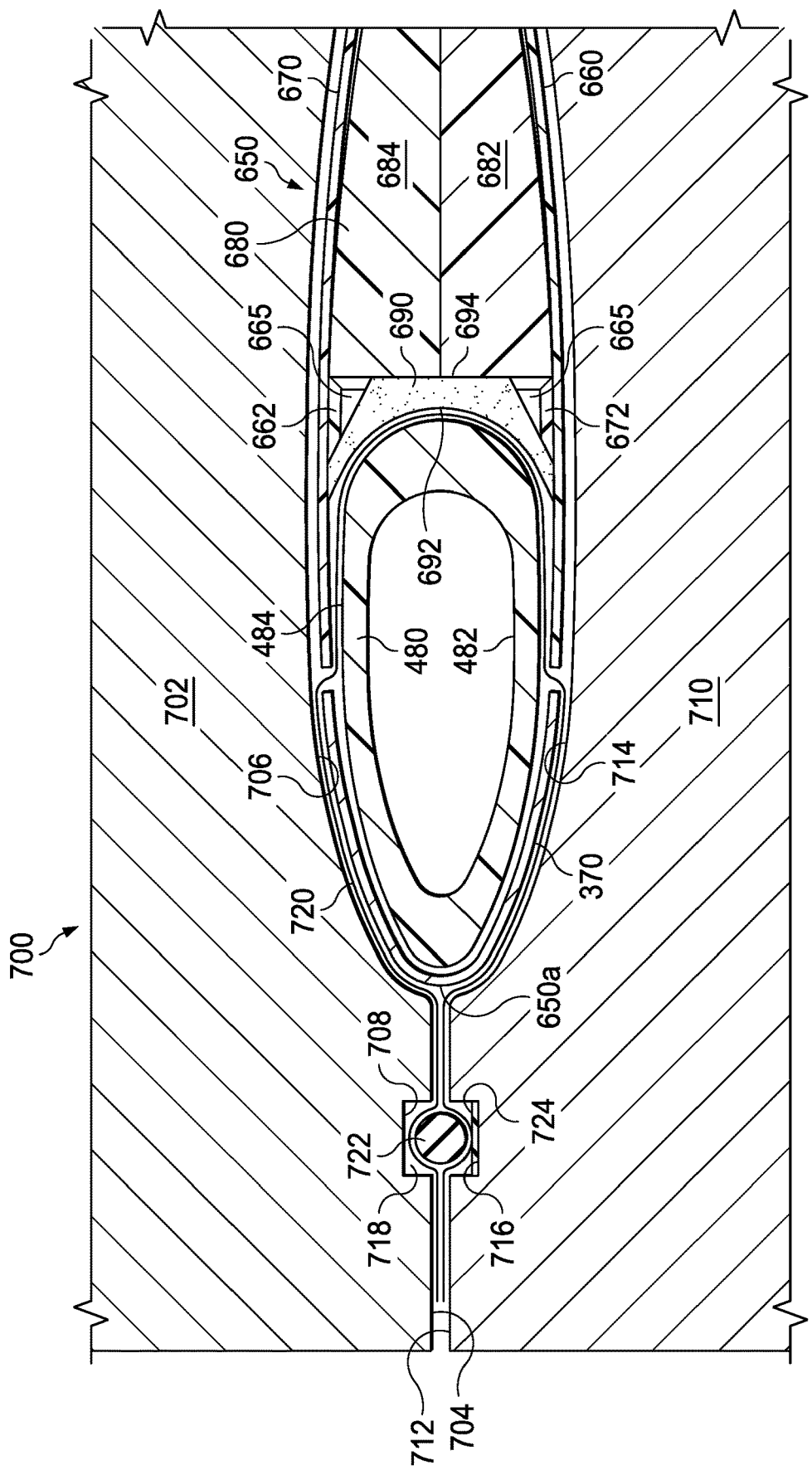
FIG. 12 is an orthogonal cut-away partial side section view of composite blade assembly of FIG. 11 and a blade bonding tool according to an embodiment of the disclosure.

Referring now to FIG. 12, an orthogonal cut-away partial side section view of the composite rotor blade assembly 650 and a blade bonding tool 700 is shown. In this embodiment, blade bonding tool 700 generally comprises an upper portion 702 and a lower portion 710. Upper portion 702 comprises an upper mold surface 704 with an upper concavity 706 and an upper notch 708 formed thereon. Similarly, lower portion 710 comprises a lower mold surface 712 having a lower concavity 714 and a lower notch 716 formed thereon, where upper mold surface 704 of upper portion 702 may face lower mold surface 712 of lower portion 710. As aligned, upper notch 708 and lower notch 716 form a cavity 718.

In the embodiment shown in FIG. 12, leading edge abrasion strip assembly 370 is disposed at the leading edge 650a of blade assembly 650 and a strap 720 is disposed about the uncured spar 480, strip assembly 370 and a silicone rod 722 disposed within the cavity 718. In an embodiment, strap 720 may comprise a glass or epoxy material that may bond to the blade assembly 650 and strip assembly 370 during the subsequent curing cycle. Strap 720 may comprise a solid material or it may comprise a net-like material having relatively large openings (e.g., approximately 1" in size). Also, a grip strip 724 is provided within cavity 718, which may be configured to "grip" or secure strap 720 during the curing cycle after upper mold surface 704 has been brought into physical engagement with lower mold surface 712. Following the curing process, a portion of the material forming strap 720 may be trimmed or removed from the cured composite assembly. Also, at least partially due to the use of strap 720, the presence of a spar dam and/or a pair of spar keys may be unnecessary in this embodiment.

Figure 13:
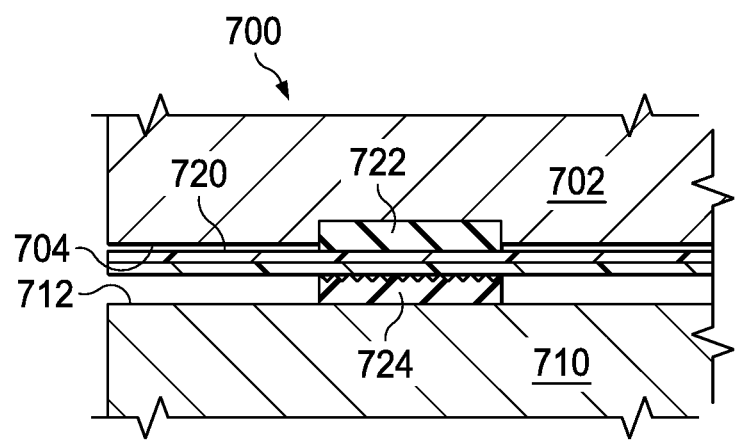
FIG. 13 is a zoomed-in orthogonal cut-away side section view of a portion of the composite blade assembly and blade bonding tool shown in FIG. 12.

Referring now to FIG. 13, a zoomed-in view of the blade bonding tool 700 and strap 720 of FIG. 12 is shown. In this view, blade bonding tool 700 has been sealed as part of commencing the curing cycle, with upper mold surface 704 of upper portion 702 is in physical engagement with lower mold surface 712 of lower portion 710. In this arrangement, silicone rod 722 has been compressed against the grip strip 724, which has secured the strap 720.

While the disclosure has contained references and discussions of composite blade assemblies, the teachings contained herein may be applied to other composite assemblies in a similar fashion. For example, the use of spar keys and/or spar dams, as discussed herein, may be similarly used in any composite assembly or structure comprising a composite spar bonded to one or more composite skins.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of constructing a cured composite assembly, comprising:
positioning a composite assembly within a bonding tool, wherein the composite assembly comprises:
an upper and a lower skin assembly extending between a leading edge and a trailing edge of the composite assembly, each of the upper and lower skin assembly having an integral spar key disposed therebetween and having a concave fore surface;

an uncured composite spar disposed between the upper skin assembly and the lower skin assembly; and an abrasion strip assembly disposed over a leading edge of each of the upper and lower skin assemblies;

reducing the size of a cavity formed between the upper skin assembly, the uncured composite spar, and the lower skin assembly; and performing a curing cycle on the composite assembly to simultaneously cure the uncured composite spar into a cured composite spar and to bond the upper and lower skin assemblies to the cured composite spar and the abrasion strip.

2. The method of claim 1, further comprising expanding an inflatable bladder disposed within a cavity of the composite spar.

3. The method of claim 2, further comprising expanding an outer surface of the composite spar.

4. The method of claim 3, further comprising restricting expansion of the composite spar in an aft direction by physically engaging the outer surface of the composite spar with each integral spar key.

5. The method of claim 3, further comprising restricting expansion of the composite spar in an aft direction by physically engaging the outer surface of the composite spar with a spar dam and physically engaging the spar dam with each integral spar key.

6. The method of claim 3, further comprising restricting expansion of the composite spar in an aft direction by physically engaging the outer surface of the composite spar with a spar dam and by physically engaging the spar dam with a support layer disposed within a core of the composite assembly.

7. The method of claim 2, further comprising reducing a size of a cavity formed between an outer surface of the composite spar and an inner concave surface of the abrasion strip assembly.

8. The method of claim 7, further comprising physically engaging the outer surface of the composite spar against an inner concave surface of the abrasion strip assembly.

* * * * *